Feb. 2, 1926.                                                                 1,571,803
J. F. RUSSELL
COCK AND VALVE PACKING
Filed Nov. 3, 1924                             2 Sheets-Sheet 1
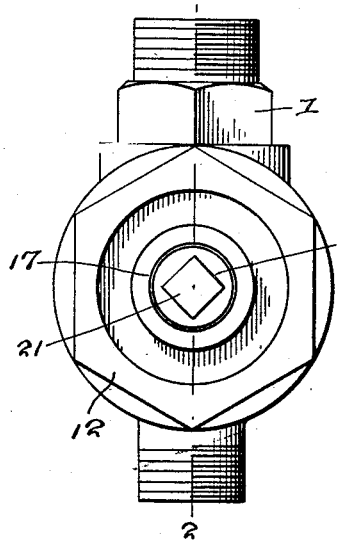
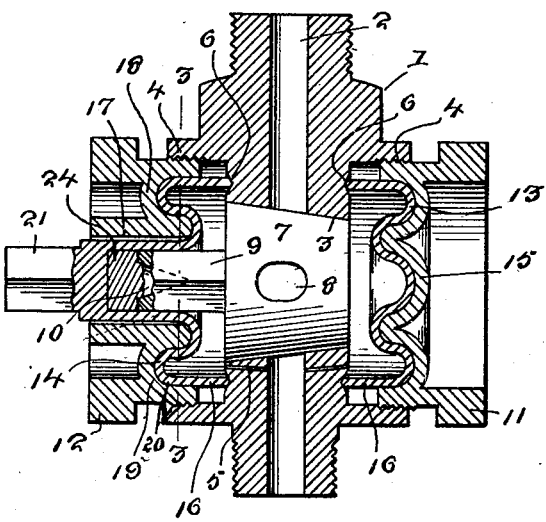
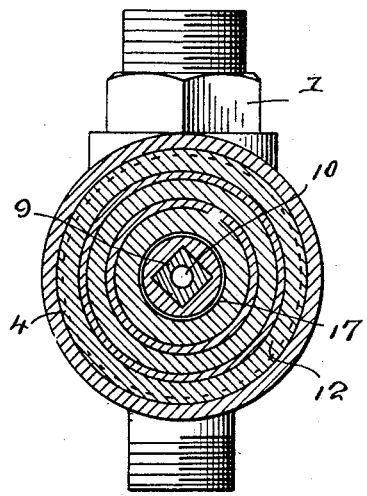
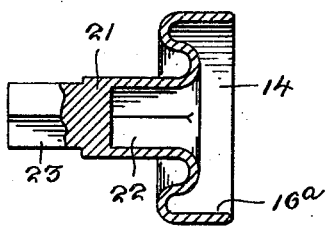
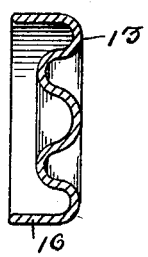
J. F. Russell
INVENTOR Feb. 2, 1926. 1,571,803
J. F. RUSSELL
COCK AND VALVE PACKING
Filed Nov. 3, 1924 2 Sheets-Sheet 2
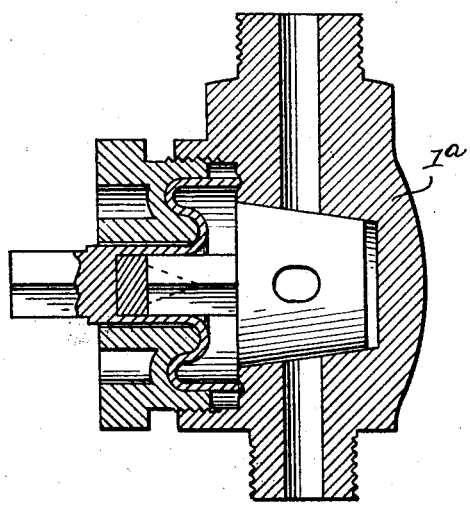
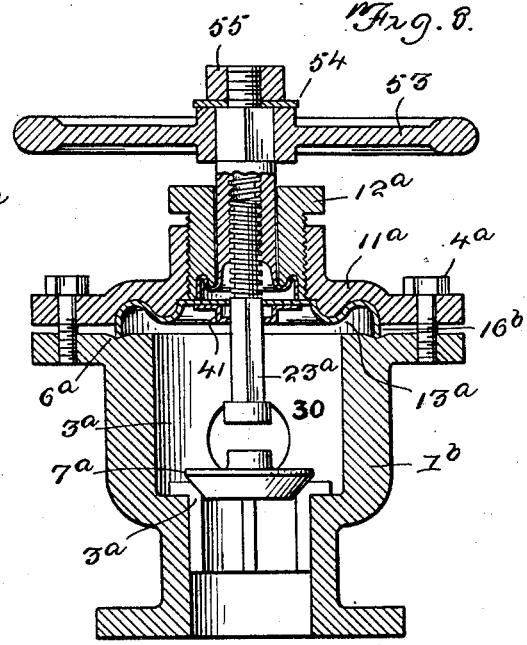
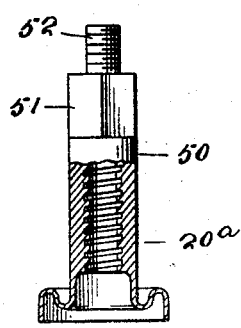
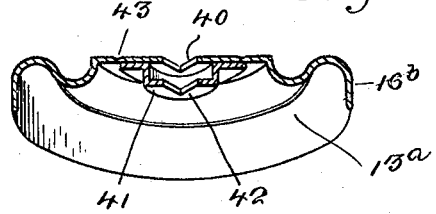
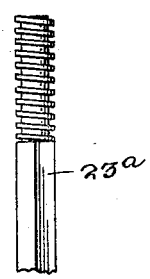
J. F. Russell INVENTOR Patented Feb. 2, 1926.

1,571,803

UNITED STATES PATENT OFFICE.

JOHN F. RUSSELL, OF NEW YORK, N. Y.

COCK AND VALVE PACKING.

Application filed November 3, 1924. Serial No. 747,609.

*To all whom it may concern:*

Be it known that I, JOHN F. RUSSELL, a citizen of Great Britain, residing at New York city, in the county of New York and State of New York, have invented new and useful Improvements in Cock and Valve Packing, of which the following is a specification.

My present invention pertains to the packing of cocks, valves and the like, and contemplates the provision of metallic packing members so constructed and adapted for use in cocks, valves and the like as to efficiently pack the same, and this without giving rise to undue friction, and in such manner that when necessity demands a packing member may be expeditiously and easily removed from a cock or valve and as readily replaced with a fresh packing member.

Other objects and practical advantages of my invention will be fully understood from the following description and claims when the same are read in connection with the drawings, accompanying and forming part of this specification, in which:—

Figure 1 is an elevation of a cock embodying my invention.

Figure 2 is a section taken in the plane indicated by the line 2—2 of Figure 1.

Figure 3 is a section on the line 3—3 of Figure 2.

Figure 4 is a detail view of one of my novel packing members.

Figure 5 is a diametrical section of the other metallic packing member of said embodiment.

Figure 6 is a detail view of the plug of the said embodiment.

Figure 7 is a section showing a cheaper embodiment in which one of the packing members alluded to is omitted.

Figure 8 is a diametrical section of a check valve equipped with modified packing means of my invention.

Figure 9 is a detail view of one of the packing members of the modification.

Figure 10 is a detail view of the other packing member of the other modification.

Figure 11 is a detail view of the threaded stem of the modification.

Similar numerals designate corresponding parts in Figures 1 to 6 to which reference will first be made.

The embodiment referred to includes a body 1 having a bore 2 intersected by a valve seat 3 and also having at opposite ends of the valve seat comparatively large interiorly threaded portions 4. The said portions 4 are connected by ports 5 with the valve seat 3 as shown in Figure 2 for a purpose before described. It will also be noted that circular grooves 6 are formed in opposite sides of the body 1 and about the ends of the seat 3 as shown in Figure 2.

In addition to the body 1, the valve comprises a plug or valve proper 7 with an elongated port 8 adapted to adequately register with the bore 2 even after the plug is adjusted to compensate for wear. The said plug 7 is provided with a stem 9 of angular cross-section in the end of which is a recess 10. In addition to the elements named the cock includes a closure plug 11 threaded to engage one of the portions 4, a closure plug 12 threaded to engage the other portion 4, a metallic packing member 13, and a metallic packing member 14. The closure plug 11 is provided at its inner end with a diaphragm 15 having a central depression and an annular groove surrounding said depression, and it will be noted that the metallic packing member 13 is provided with a central depression and an annular groove surrounding said depression so that said packing member 13 will snugly rest in and be braced and supported by the diaphragm 15. It will also be noted that the packing member 13 includes a marginal flange 16 the edge of which is arranged to seat from one of the circular grooves 6 of the body 1. Exteriorly the plug 12 is preferably though not necessarily shaped as shown, and it will be noted that the said plug 12 is provided with a central bore 17, and with a diaphragm 18 which has an annular groove 19 surrounding the bore 17. In the said groove 19 is snugly seated the annular groove portion of a metallic packing member 20, the said member 20 having a flange 16ª for cooperation with the valve body 1 in the same manner as the before described flange 16. The said packing member 20 is integral with a stem 21 which is chambered at 22 and has an angular end 23 for the application of a handle, and it will be noted that the member 20 is merged into the wall of the said chamber 22. As indicated by 24 in Figure 2 a compressible packing of any appropriate material is disposed in the chamber 22 and in the recess 10 of the plug stem 9. Manifestly the diaphragm 18 of the closure plugs 12 will brace and support the packing member 20 in the same manner that the diaphragm 15 of the plug 11 braces and supports the packing member 13.

Manifestly the packing members 13 and 20 relatively arranged as shown will preclude leakage, and this without undue friction between the packing member 20 and the valve body 1. The ports 5 before alluded to are designed and adapted to drain moisture from the chambers at opposite sides of the valve seat 3 and within the packing members 13 and 20 into the bore 2. It will also be appreciated that the relative arrangement of the packing members 13 and 20 is such that when necessity demands either of the packing members may be readily removed and as readily replaced with a fresh packing member.

The packing member 13 is omitted together with the closure plug 11 from the modification shown in Figure 7, the said modification being a cheaper type characterized by an integral body portion $1^a$ which serves in lieu of the closure plug 11 and the packing member 13.

The valve modification illustrated in Figure 8 is of check type and includes a body $1^b$, a valve seat $3^a$, a valve body $7^a$, a cap $11^a$ connected at $4^a$ to the body, a nut $12^a$ threaded in the body, a stem $23^a$ threaded as shown and opposed to the valve body $7^a$ so as to limit the opening of the latter, a metallic packing member $13^a$ and a packing member $20^a$. The body $1^b$ is provided about a chamber 30 therein with a circular groove $6^a$, and it will be observed that the cap $11^a$ is corrugated or provided with a circular groove and a circular rib, the latter about the threaded portion of the cap in which the nut $12^a$ is disposed. The metallic packing member $13^a$ is shaped—i. e., corrugated, to snugly conform to and be braced and supported by the inner face of the cap $11^a$ and is provided with a marginal flange $16^b$ to seat in the groove $6^a$ of the body $1^b$. It will also be noted that the said member $13^a$ is provided with a central angular aperture 40 to receive the angular stem $23^a$, and that in order to strengthen the engagement of the member $13^a$ with the stem $23^a$ the said member $13^a$ is provided with a central offset portion 41, appropriately fixed to the member $13^a$ and having an angular aperture 42 in coincidence with the aperture 40. As shown in Figures 8 and 10 the metallic packing member $13^a$ is provided with a circular groove 43 to receive the end of the metallic packing member $20^a$, Figure 8. This provision which involves cooperation between the packing members $13^a$ and $20^a$ obviously serves to efficiently prevent leakage at the top of the valve. The packing member $20^a$ is carried at the lower end of an interiorly threaded sleeve 50, the sleeve 50 being exteriorly partly circular and having adjacent to its outer end an angular portion 51 which merges into a threaded end 52, the angular portion 51 being for the engagement of a handle 53 for the turning of the member $20^a$ about its axis, and the end 52 being for the mounting of a washer 54 and a nut 55. The sleeve stem of the member $20^a$ is adapted to be turned about its axis in the nut $12^a$, and it will be noted that the packing member $20^a$ is corrugated to conform to and snugly fit and be braced by the inner end of the nut $12^a$. Manifestly turning of the packing member $20^a$ will be attended by but little friction and hence while the said packing members will efficiently prevent leakage they will not render the valve hard to operate. Again it will be appreciated that when either of the packing members $13^a$ and $20^a$ is impaired or worn it may be quickly and easily removed and as readily replaced with a fresh packing member.

It will be readily understood from the foregoing that metallic packing members of my invention and characterized as stated can be economically manufactured in large quantity; also that the packing members of metal being corrugated permit of equal expansion and contraction and contribute to flexibility of operation. In this connection, I would have it understood that I prefer to form the packing members of metal possessed of flexible and hard and tough quality such as Muntz metal.

I have specifically described the constructions of the preferred embodiments of my invention in order to impart an exact understanding of said embodiments. I do not desire, however, to be understood as confining myself to the specific construction and relative arrangement of parts as disclosed, my invention being defined by my appended claims within the scope of which modifications may be made without departure from my invention.

Having described my invention, what I claim and desire to secure by Letters-Patent, is:—

1. The combination in means for the purpose described, of a body having a valve seat and a bore intersecting said valve seat and also having grooves about the ends of said valve seat, a valve disposed in said seat and tapered and having an elongated aperture and also having a stem of angular cross-section, closure plugs connected with the body in opposed relation to the ends of the valve seat and having inner corrugated surfaces, one of said plugs also having a central bore receiving the stem of the valve, a corrugated metallic packing member backed by one of said plugs and having a marginal flange disposed in one groove of the body, and a corrugated packing member backed by the other closure plug and having a marginal flange in the other groove of the body and also having a hollow stem receiving the angular stem of the valve and arranged and adapted to be turned in the bore of the closure plug.

2. The combination of a valve body having a valve seat and a bore intersecting said seat and also having a groove surrounding one end of said seat, a closure plug connected to the body and having an inner corrugated end and also having a central bore, a valve in the seat and having an angular stem disposed in said bore, and a corrugated metallic packing member having a flange arranged in said groove and also having a hollow stem extending through said bore and receiving the stem of the valve.

In testimony whereof I have affixed my signature.

JOHN F. RUSSELL.